(12) United States Patent
Faibish et al.

(10) Patent No.: US 10,372,770 B1
(45) Date of Patent: Aug. 6, 2019

(54) CLOUD-BASED PLATFORM FOR SEMANTIC INDEXING OF WEB OBJECTS

(71) Applicant: EMC IP Holding Company LLC, Hopkinton, MA (US)

(72) Inventors: Sorin Faibish, Newton, MA (US); Sassan Teymouri, Saratoga, CA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 529 days.

(21) Appl. No.: 15/276,074

(22) Filed: Sep. 26, 2016

(51) Int. Cl.
*G06F 16/00* (2019.01)
*G06F 16/9535* (2019.01)
*G06N 20/00* (2019.01)
*G06F 16/81* (2019.01)
*G06F 16/901* (2019.01)

(52) U.S. Cl.
CPC .......... *G06F 16/9535* (2019.01); *G06F 16/81* (2019.01); *G06F 16/9024* (2019.01); *G06N 20/00* (2019.01)

(58) Field of Classification Search
None
See application file for complete search history.

(56) References Cited

U.S. PATENT DOCUMENTS 8,315,998 B1 11/2012 Dean
9,715,493 B2 * 7/2017 Papadopoullos ..... G06F 17/275

2013/0159451 A1 6/2013 Luciw
2014/0032518 A1 1/2014 Cohen et al.
2016/0041986 A1 2/2016 Nguyen

OTHER PUBLICATIONS

M. Wylot et al., "dipLODocus[RDF]—Short and Long-Tail RDF Analytics for Massive Webs of Data," 10th International Semantic Web Conference (ISWC), Oct. 23-27, 2011, pp. 778-793, vol. Part I.

(Continued)

*Primary Examiner* — Bai D Vu

(74) *Attorney, Agent, or Firm* — Ryan, Mason & Lewis, LLP

(57) ABSTRACT

An apparatus in one embodiment comprises a cloud-based web object indexing platform configured to communicate with multiple web servers over at least one network. The cloud-based web object indexing platform comprises a plurality of indexing applications having respective machine learning engines, with a given one of the indexing applications being configured to receive web objects over the network from one or more of the web servers and to process the received web objects utilizing its corresponding machine learning engine. The given indexing application is further configured to generate semantic information for association with particular ones of the web objects based at least in part on processing results provided by the corresponding machine learning engine. The semantic information is made accessible by the cloud-based web object indexing platform in association with the particular web objects over the network, for example, to a search engine or data analytics engine.

20 Claims, 5 Drawing Sheets

(56) References Cited

OTHER PUBLICATIONS

W3C Recommendation, "Resource Description Framework (RDF): Concepts and Abstract Syntax," http://www.w3.org/TR/2004/REC-rdf-concepts-20040210/, Feb. 10, 2004, 21 pages.

R. Sridhar et al., "RAPID: Enabling Scalable Ad-Hoc Analytics on the Semantic Web," 8th International Semantic Web Conference (ISWC), Oct. 25-29, 2009, pp. 703-718.

U.S. Appl. No. 14/977,960, filed in the name of Sorin Faibish et al. on Dec. 22, 2015 and entitled "Multi-Tier Storage System Having a Front-End Storage Tier Facilitating Efficient Graph Analytics Computations."

\* cited by examiner

CLOUD-BASED PLATFORM FOR SEMANTIC INDEXING OF WEB OBJECTS

FIELD

The field relates generally to information processing systems, and more particularly to processing of web objects in information processing systems.

BACKGROUND

Web objects illustratively include various types of identifiable information units that are made accessible to user devices or other accessing devices over a network such as the Internet. Examples of web objects that are typically processed in information processing systems include web pages. A given such web page may itself include multiple distinct web objects such as text, images and video. Improvements are needed in conventional techniques for processing of web objects.

DETAILED DESCRIPTION

Illustrative embodiments will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

These and other illustrative embodiments disclosed herein include, without limitation, apparatus, systems, methods, and computer program products comprising processor-readable storage media.

Figure 1:
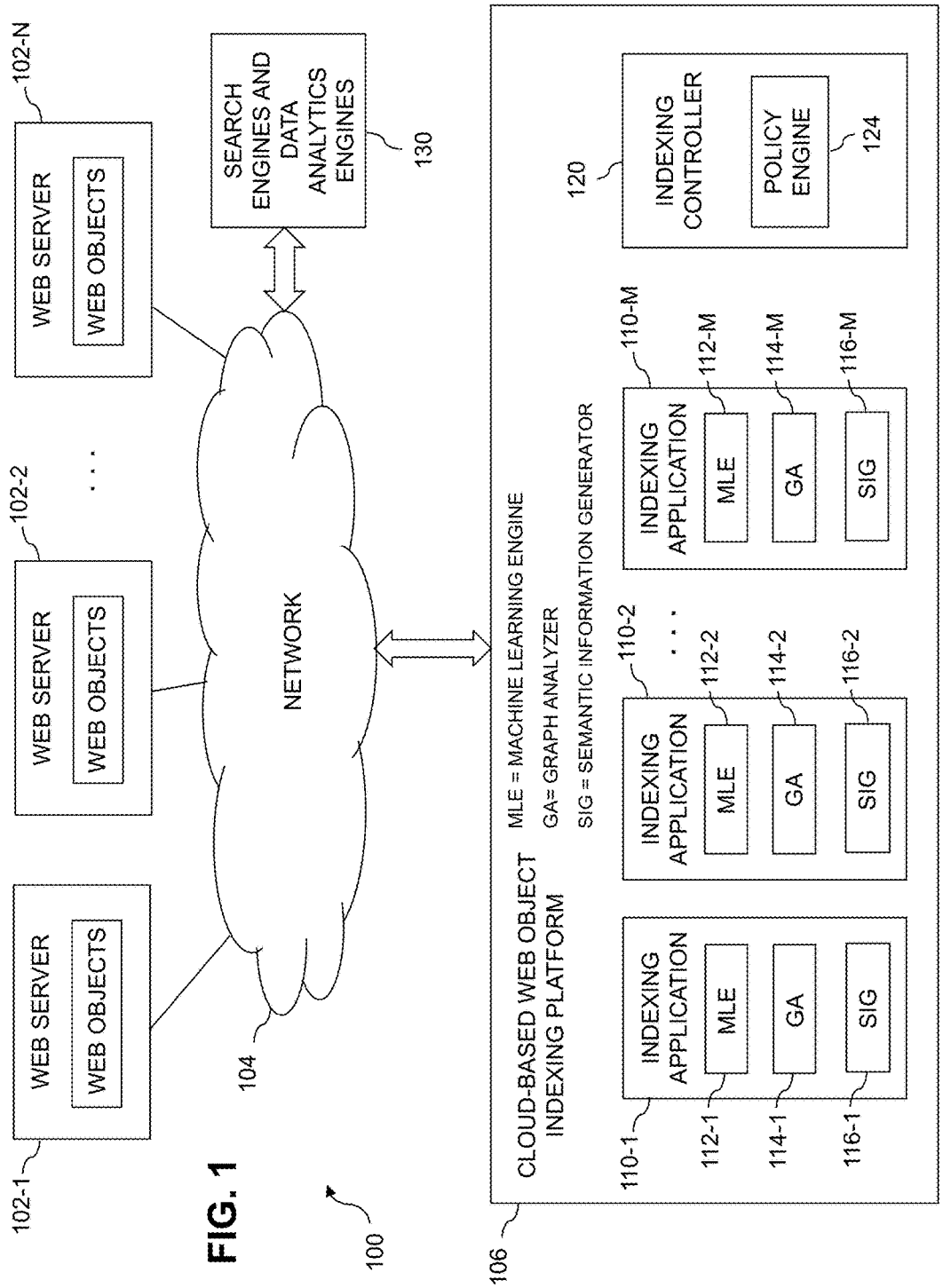
FIG. 1 is a block diagram of an information processing system comprising a cloud-based platform for semantic indexing of web objects in an illustrative embodiment.

FIG. 1 shows an information processing system 100 configured in accordance with an illustrative embodiment. The information processing system 100 comprises web servers 102-1, 102-2, . . . 102-N that store respective sets of web objects. Each of the web servers 102 may store a different set of web objects. Alternatively, two or more of the web servers 102 may each store the same set of web objects. The web servers 102 are coupled to a network 104. The system 100 further comprises a cloud-based web object indexing platform 106 configured to communicate with the web servers 102 over the network 104.

The cloud-based web object indexing platform 106 in this embodiment comprises indexing applications 110-1, 110-2, . . . 110-M. The indexing applications 110-1, 110-2, . . . 110-M comprise respective machine learning engines or MLEs 112-1, 112-2, . . . 112-M, respective graph analyzers or GAs 114-1, 114-2, . . . 114-M, and respective semantic information generators or SIGs 116-1, 116-2, . . . 116-M.

The indexing applications 110 are configured to receive web objects over the network 104 from one or more of the web servers 102 and to process the received web objects utilizing their corresponding machine learning engines 112. Each of the indexing applications 110 is further configured to generate semantic information for association with particular ones of the web objects based at least in part on processing results provided by its corresponding machine learning engine. The semantic information generated by the indexing applications 110 is made accessible by the cloud-based web object indexing platform 106 in association with the particular web objects over the network 104.

It should be noted that the number N of web servers 102 and the number M of indexing applications 110 are intended to encompass arbitrary integers greater than or equal to one. Although the present embodiment illustratively shows multiple web servers 102 and multiple indexing applications 110, other embodiments could include, for example, only a single web server interacting with multiple indexing applications, or multiple web servers interacting with only a single indexing application.

Also, the term "web server" as used herein is intended to be broadly construed so as to encompass any network device capable of providing one or more web objects deliverable over a network. It should not be construed as requiring delivery of web objects in accordance with any particular network protocol.

The cloud-based web object indexing platform 106 further comprises an indexing controller 120 associated with the indexing applications 110 and configured to control semantic information generation functionality of the indexing applications 110. Such functionality illustratively includes image processing functionality implemented on a graphical processing unit. Examples of arrangements of this type will be described below in conjunction with the illustrative embodiments of FIGS. 3 and 4.

Additionally or alternatively, semantic information generation functionality of the indexing applications 110 comprises map-reduce functionality implemented on a map-reduce processing unit. An example of an arrangement of this type will be described below in conjunction with the illustrative embodiment of FIG. 5.

The cloud-based web object indexing platform 106 illustratively comprises processing devices of one or more processing platforms. Such processing devices can be interconnected with one another using high-speed connections. For example, data can be moved between processing devices of the platform 106 using remote direct memory access (RDMA) connections over InfiniBand or Gigabit Ethernet. Numerous other types of connections and associated data transfer protocols can be used in other embodiments.

The indexing controller 120 comprises a policy engine 124 and is configured to adapt the operation of a given one of the indexing applications 110 to at least one policy of the policy engine 124. For example, the policy engine 124 can provide a policy or set of policies that identifies at least one of particular types of web objects to be associated with semantic information by the given indexing application and particular manners in which those web objects are to be associated with semantic information by the given indexing application. Other types of policy-based controller implementations can be used.

The cloud-based web object indexing platform 106 is configured to process web objects that illustratively comprise at least one of text, images and video. For example, a given one of the web objects may comprise a web page having as elements thereof two or more of text, images and video. In an arrangement of this type, different portions of the semantic information are illustratively associated with respective different descriptors of respective ones of the elements of the web page. It is therefore possible in some embodiments for a given complex web page to have multiple web objects each of which is separately enhanced with semantic information generated using one or more of the indexing applications 110 of the cloud-based web object indexing platform 106.

The semantic information may comprise RDF triples, of the form subject-predicate-object, where RDF denotes the Resource Description Framework of the World Wide Web Consortium (W3C). Additional details on RDF can be found in W3C Recommendation 10, "Resource Description Framework (RDF): Concepts and Abstract Syntax," February 2004, which is incorporated by reference herein. Although some embodiments utilize RDF triples to provide at least a portion of the semantic information, additional or alternative types of semantic information can be used in other embodiments. For example, other types of semantic information tuples having more or fewer than three elements can be used.

The machine learning engines 112 in some embodiments comprise respective neural networks. The neural networks have respective learning data sets generated based at least in part on previously-processed web objects.

Figure 4:
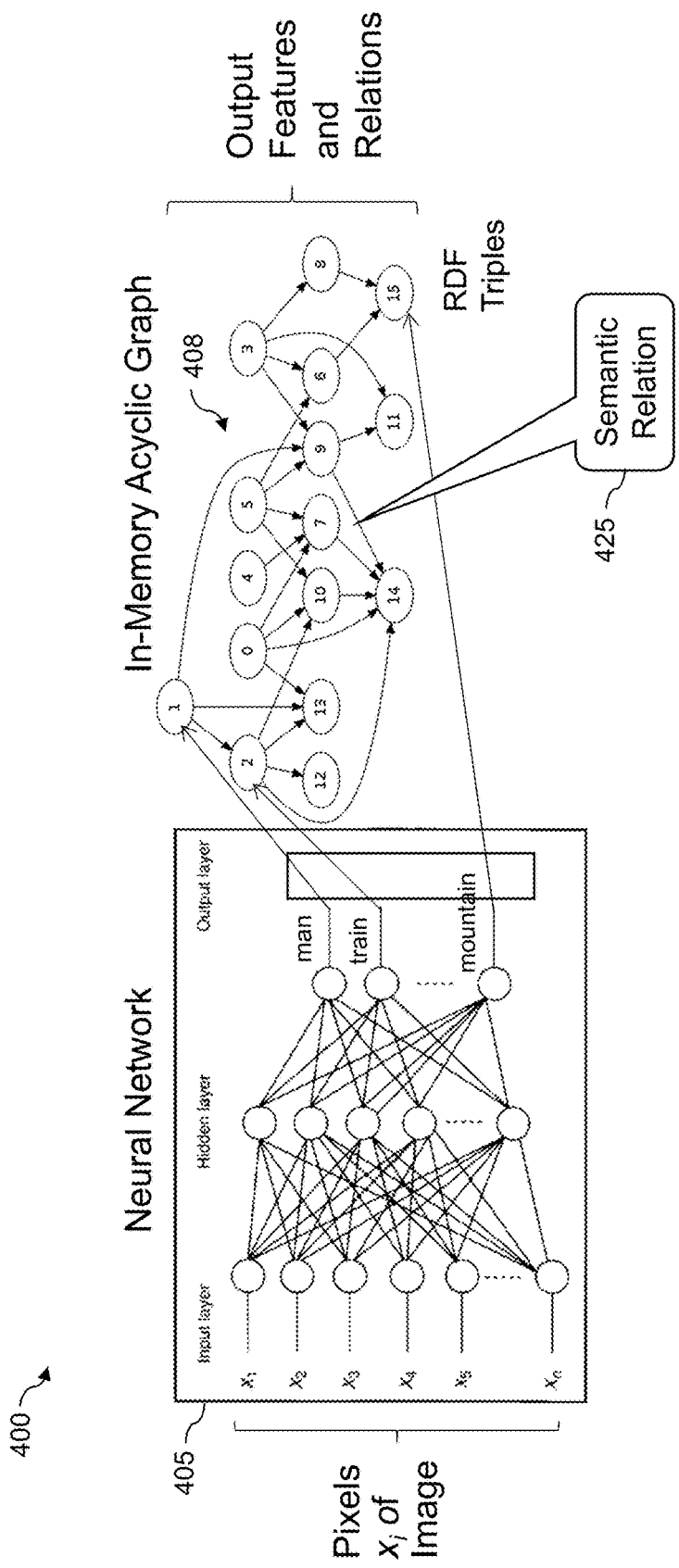

The graph analyzers 114 are each configured to generate an acyclic graph characterizing relationships between elements of at least a subset of the web objects. The acyclic graph illustratively provides an additional machine learning processing layer at an output of a neural network of the corresponding machine learning engine of a given indexing application, as illustrated in the embodiment of FIG. 4.

As indicated previously, a given one of the indexing applications 110 may be configured to implement map-reduce processing. In such an arrangement, one or more outputs of a map phase of the map-reduce processing are fed back as learning data inputs to the machine learning engine of the given indexing application prior to performing a reduce phase of the map-reduce processing. A more detailed example of an arrangement of this type will be described below in conjunction with the embodiment of FIG. 5.

The semantic information generators 116 of the respective indexing applications 110 receive processing results from the corresponding machine learning engines 112. Each of the semantic information generators 116 generates separate sets of semantic information for respective ones of the web objects.

A given one of the indexing applications 110 is configured to associate semantic information with particular web objects by incorporating portions of the semantic information into metadata of respective ones of the particular web objects. For example, the given indexing application can associate the semantic information with the particular web objects by incorporating portions of the semantic information into respective extensible mark-up language (XML) semantic information fields of respective ones of the particular web objects. The portion of the semantic information incorporated into the XML semantic information field of one of the particular web objects illustratively comprises at least one RDF triple.

The cloud-based web object indexing platform 106 makes the semantic information accessible in association with particular web objects over the network 104 by storing the semantic information in association with the particular web objects in a manner that is accessible to other devices coupled to network 104, such as search engines and data analytics engines collectively denoted by reference numeral 130 in the figure. This may illustratively involve providing modified versions of the particular web objects back to the web servers 102 from which the web objects were previously received, with the modified versions comprising respective corresponding portions of the semantic information.

In some embodiments, different ones of the indexing applications 110 are configured for processing different types of web objects. For example, one type of indexing application may be configured to analyze images and video, while another type of indexing application is configured to analyze web page text.

A given one of the indexing applications 110 configured to analyze images and video can detect features in the images and video and compare detected features across multiple distinct web objects in order to generate the semantic information. This may involve identifying previously-analyzed images or video already having associated semantic information that are sufficiently similar to images or video currently being processed. Such an arrangement can significantly reduce the field of search for analyzing a given image or video.

A given one of the indexing applications 110 configured to analyze web page text can perform semantic interpretation of the text and generate corresponding semantic information for association with the corresponding web page. This may involve identifying previously-analyzed web pages having associated semantic information that are sufficiently similar to the web page currently being processed. Again, such an arrangement can significantly reduce the field of search for analyzing a given web page.

These and other indexing applications 110 are illustratively configured to analyze web objects and to associate semantic information with those web objects based at least in part on results of the analysis. For example, semantic information in the form of one or more RDF triples can be inserted into a semantic information field of an XML file of the web object so as to be made visible to search engines, data analytics engines or other devices or systems that request that web object over a network.

One or more of the indexing applications 110 are illustratively configured to utilize the policy engine 124 in the indexing controller 120 in order to identify particular web objects that are to be enhanced with particular types of semantic information. A given such indexing application can also maintain a learning data set for its corresponding machine learning engine. For example, such a learning data set can be updated using analysis results from each web object that is analyzed by the indexing application.

In some embodiments, one or more of the indexing applications 110 each utilize map-reduce functionality to identify web objects that are similar to the web object currently being analyzed and to provide the similar web objects and their associated semantic information as inputs to the machine learning engine.

The cloud-based web object indexing platform 106 makes the semantic information generated by the indexing applications 110 accessible to the search and data analytics engines 130 over the network 104. The engines 130 therefore need not perform separate semantic analysis on each web object, and as a result the operational efficiency of the engines 130 is substantially improved. Moreover, the quality of the search or analytics output of such engines is enhanced through the use of the semantic information generated by the indexing applications 110 and associated with the web objects.

The indexing applications 110 in some embodiments are implemented at least in part by respective virtual machines of cloud infrastructure. For example, such indexing applications 110 can be implemented in the form of software executed using processor and memory components of the virtual machines.

Examples of cloud infrastructure that can be used in some embodiments include public clouds provided by a cloud-based system such as the Amazon Web Services (AWS) system. Other examples of cloud-based systems that can be used to provide virtual machines for implementing indexing applications 110 and possibly other portions of system 100 include Google Cloud Platform (GCP) and Microsoft Azure.

The cloud-based web object indexing platform 106 is illustratively configured to implement at least one storage system for storing web objects and associated semantic information. A given such storage system illustratively comprises at least one file system for organizing data stored by or on behalf of the indexing applications 110. Such a file system may comprise a parallel file system, a distributed file system or combinations of multiple file systems of potentially different types.

In some embodiments, the cloud-based web object indexing platform 106 comprises a software-defined storage pool accessible to the indexing applications 110. Such a software-defined storage pool can be implemented using software-defined storage products such as ScaleIO™ or ViPR® both of which are commercially available from EMC Corporation of Hopkinton, Mass. At least a subset of the indexing applications 110 can share storage resources of such a software-defined storage pool.

A given storage system of the cloud-based web object indexing platform 106 may illustratively comprise multiple distinct storage tiers, such as a fast tier and a capacity tier. By way of example, the cloud-based web object indexing platform 106 may illustratively comprise a 2 TIERS™ storage system from EMC Corporation, with the fast tier implemented using DSSD™ server-based flash storage devices and the capacity tier comprising one or more object stores. Examples of object stores that may be used in some embodiments include Amazon S3, GCP Cloud Storage, and Microsoft Azure Blob Storage.

Other examples of storage systems that can be incorporated into the cloud-based web object indexing platform 106 for storing web objects in association with semantic information include network-attached storage (NAS), storage area networks (SANs), direct-attached storage (DAS) and distributed DAS, as well as combinations of these and other storage types.

A given storage system may comprise storage arrays such as VNX® and Symmetrix VMAX® storage arrays, both commercially available from EMC Corporation. Other types of storage products that can be used in implementing a given storage system in an illustrative embodiment include the previously-mentioned software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The indexing applications 110 and indexing controller 120, as well as other system components, may be implemented at least in part using processing devices of such processing platforms.

For example, a given indexing application or indexing controller as disclosed herein can be implemented in one or more LXCs running on respective virtual machines or other types of processing devices of a given processing platform.

Communications between the various elements of system 100 take place over one or more networks including the network 104. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It is to be appreciated that these and other features of illustrative embodiments are presented by way of example only, and should not be construed as limiting in any way. The particular sets of modules and other components implemented in the system 100 as illustrated in FIG. 1 are therefore illustrative only. In other embodiments, only subsets of these components, or additional or alternative sets of components, may be used, and such components may exhibit alternative functionality and configurations.

Accordingly, different numbers, types and arrangements of web servers, networks, platforms, indexing applications, controllers and other components for providing semantic indexing of web objects can be used in other embodiments.

The operation of the information processing system 100 will now be described in further detail with reference to the flow diagram of FIG. 2. The process as shown includes steps 200 through 206, and is suitable for use in the system 100 but is more generally applicable to other types of information processing systems comprising a cloud-based web object indexing platform having one or more indexing applications configured to provide semantic indexing of web objects. The process is illustratively performed by a cloud-based web object indexing platform, such as the platform 106 in the FIG. 1 embodiment.

In step 200, web objects are received in a given indexing application of a cloud-based web object indexing platform from one or more web servers over a network. For example, the cloud-based object indexing platform can process requests from the web servers for generation of semantic information, with such requests being received from the web servers with the corresponding web objects to be processed. Additionally or alternatively, the cloud-based web object indexing platform can in some cases request delivery of particular web objects from the web servers.

In step 202, the received web objects are processed in the given indexing application utilizing its corresponding machine learning engine. The machine learning engine is configured in accordance with a machine learning data set based at least in part on previously-processed web objects.

In step 204, semantic information is generated in the indexing application for association with particular ones of the received web objects based at least in part on processing results provided by the corresponding machine learning engine. For example, the given indexing application is illustratively configured to associate the semantic information with the particular web objects by incorporating portions of the semantic information into metadata of respective ones of the particular web objects.

In step 206, the semantic information is made accessible in association with the particular web objects over the network to one or more search engines and/or data analytics engines. The semantic information may be made accessible in association with the particular web objects over the network, for example, by providing modified versions of the particular web objects back to the web servers from which the web objects were previously received, with the modified versions comprising respective corresponding portions of the semantic information.

Other techniques for making the semantic information accessible can be used in other embodiments. For example, the semantic information can be provided by the cloud-based web object indexing platform back to the web servers separate from the associated web objects from which the semantic information is generated. The web servers can then incorporate the semantic information received from the cloud-based web object indexing platform into the web objects that are delivered by those web servers over the network to requesting entities, such as search engines, data analytics engines or other devices or systems that utilize web objects.

After completion of step 206, the process returns to step 200 to process additional web objects received in the cloud-based web object indexing platform from web servers over the network. The resulting semantic information is associated with the corresponding web objects, and such semantic information serves not only to improve the efficiency of search engines or data analytics engines that process the enhanced web objects, it allows those engines to generate more accurate and useful search or analytics outputs.

For example, many web pages or other web objects do not include semantic information in their conventional XML descriptions. By generating such semantic information and inserting it into the XML descriptions of the web objects as disclosed herein, improved search and analytics performance can be achieved in an efficient manner that does not interfere with the search or analytics functionality of the engines 130.

Figure 2:
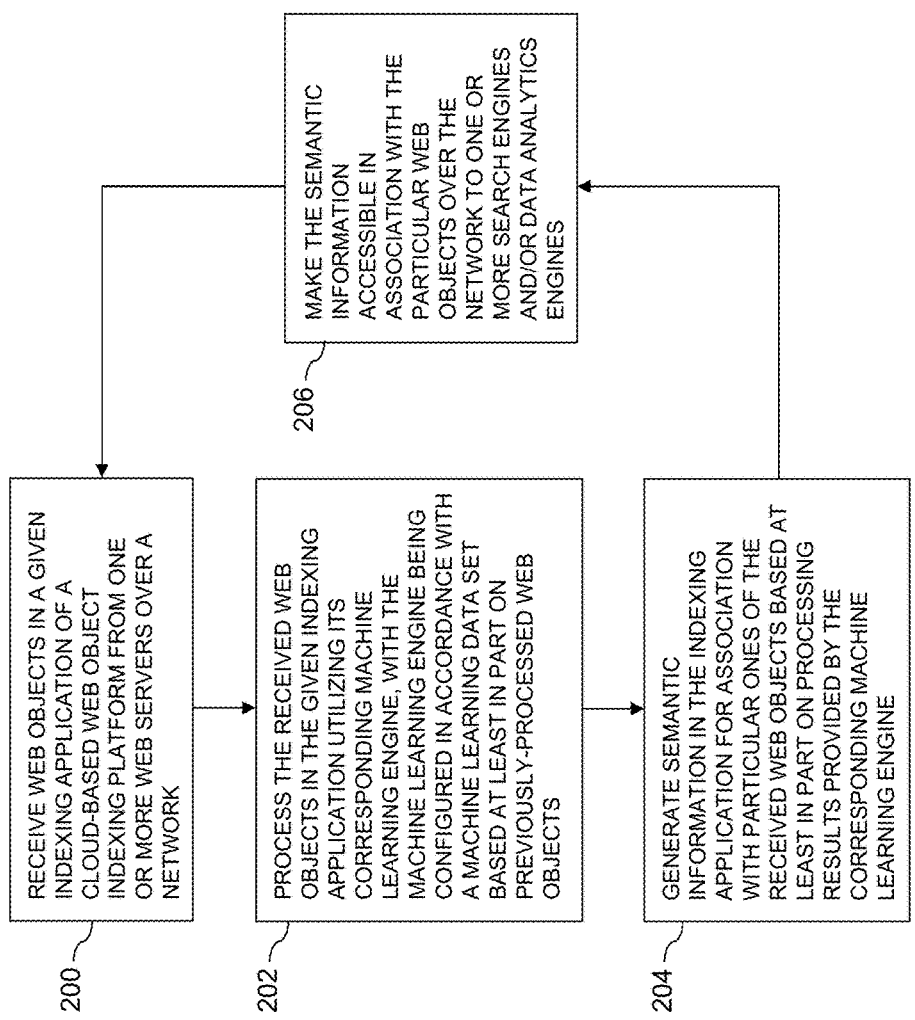
FIG. 2 is a flow diagram of a process for semantic indexing of web objects in an illustrative embodiment.

The FIG. 2 process can be adapted for use in a wide variety of different use cases involving web objects.

For example, assume a web designer generates new web objects each including text and images. Prior to making each new web object publicly available, the web designer provides the new web object to an indexing application of a cloud-based web object indexing platform. The indexing application processes each new web object to generate semantic information in the form of RDF triples that are inserted into an XML description or other similar description of that new web object. The semantic information and its associated web object become part of the learning data set of the machine learning engine of the indexing application and are utilized in semantic analysis of the next new web object submitted by the web designer. The resulting enhanced web objects when made publically available are substantially easier for external engines to search and analyze. Moreover, as its learning data set becomes more comprehensive, the indexing application can in some embodiments provide feedback to the web designer that helps to accelerate the development of additional web objects.

As another example, a web site administrator can utilize an indexing application of a cloud-based web object indexing platform to enhance all web objects of multiple pages of a given web site with semantic information such as RDF triples. The learning data set in such an arrangement can incorporate each web object that is analyzed by the indexing application. The web site administrator can also enforce a policy specifying that any new web object that is posted to any web page of the web site will first be submitted to the indexing application for analysis such that semantic information will be automatically generated and added to the new web objects. Web designers developing such new web objects for the given web site can utilize the learning data set of the machine learning engine in the indexing application to optimize their designs based on semantics of existing web objects of the web site.

As a further example, a video surveillance system comprising multiple cameras can generate web objects in the form of images or video. Such images or video are illustratively supplied to an indexing application of a cloud-based web object indexing platform in order to enhance the images or video with semantic information such as RDF triples indicating the detection of particular features within the images or video. These features can include particular faces, vehicles, weapons or other items of interest detectable within the images or video. The semantic information characterizing the presence of such items of interest within the images or video can considerably facilitate subsequent searching of images or video upon receipt of a specific search request. The RDF triples can be time stamped in order to associate them with particular images or video.

Again, these use cases are examples, and those skilled in the art will readily appreciate that the FIG. 2 process can be adapted for use in numerous other operating environments involving web objects.

The particular processing operations and other system functionality described in conjunction with the flow diagram of FIG. 2 are presented by way of illustrative example only, and should not be construed as limiting the scope of the invention in any way. Alternative embodiments can use other types of processing operations involving one or more cloud-based indexing applications configured to provide semantic indexing of web objects. For example, the ordering of the process steps may be varied in other embodiments, or certain steps may be performed concurrently with one another rather than serially. Also, one or more of the process steps may be repeated periodically, or multiple instances of the process can be performed in parallel with one another for different sets of web objects or indexing applications within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems implementing cloud-based semantic indexing techniques will now be described with reference to FIGS. 3 through 5. It is assumed without limitation for these illustrative embodiments that the machine learning engine of a given one of the indexing applications comprises a complex neural network having multiple layers, such as an input layer, a hidden layer, an "old" output layer and a "new" output layer, although other types of neural networks or machine learning engines can be used in other embodiments.

Figure 3:
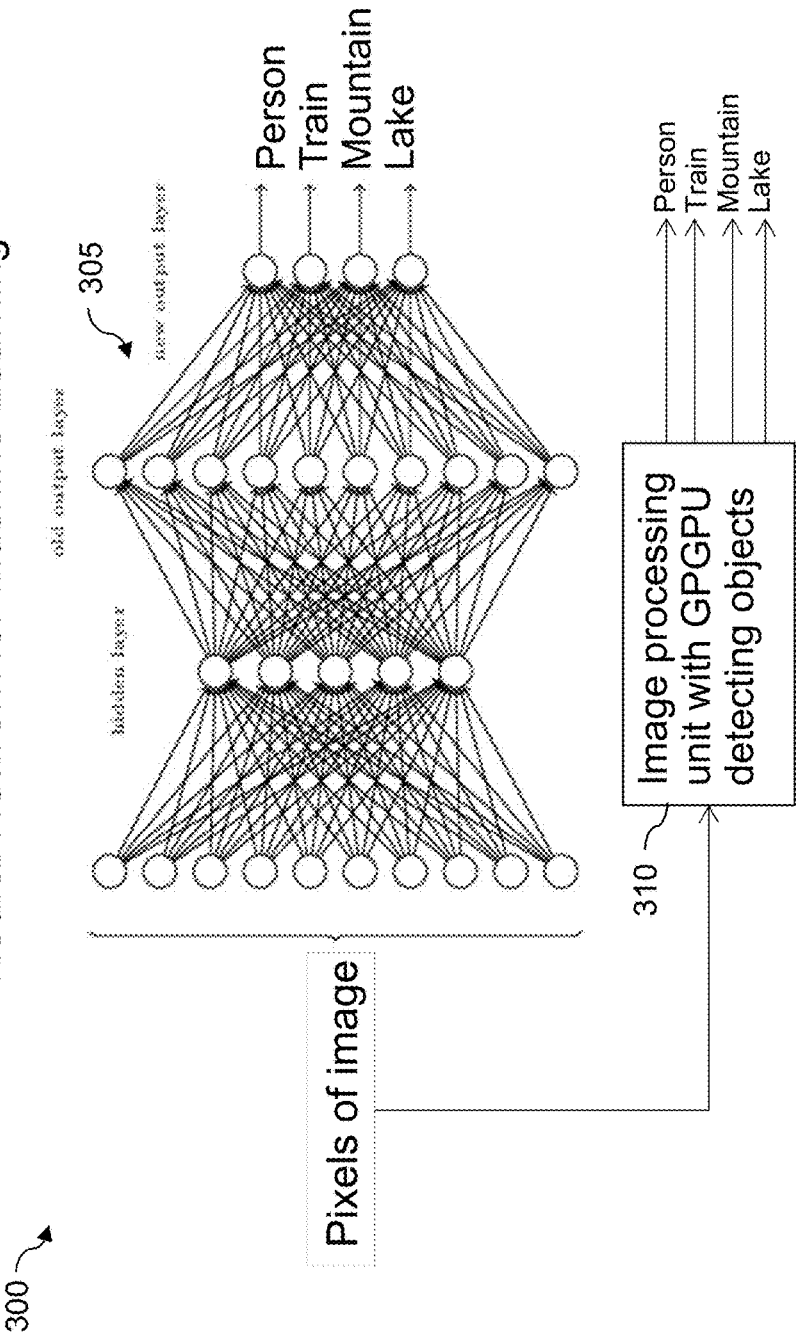
FIGS. 3, 4 and 5 illustrate respective examples of semantic indexing of web objects in other embodiments.

Referring now to FIG. 3, an information processing system 300 comprises a machine learning engine having a neural network 305. The neural network 305 in this embodiment is assumed to be implemented at least in part by an image processing unit 310 that illustratively comprises a general-purpose graphics processing unit (GPGPU) configured to detect particular designated objects, such as a person, a train, a mountain or a lake, in web objects comprising respective images. Pixels of a given image are applied to respective inputs of an input layer of the neural network 305. The pixels are processed within the neural network 305 to generate at the new output layer indications regarding the presence of the particular designated objects within the corresponding image. Such indications are utilized to generate semantic information that is associated with the given image.

The image processing unit 310 and its associated neural network 305 in the FIG. 3 embodiment are assumed to be part of a machine learning engine corresponding to a particular indexing application of a cloud-based web object indexing platform. Such an indexing application can include additional components such as a graph analyzer and a semantic information generator that process outputs of the neural network 305 to provide semantic information that is associated with the particular image being processed.

Another illustrative embodiment is shown in FIG. 4. In this embodiment, an information processing system 400 comprises a neural network 405, which is once again assumed to be part of an indexing application of a cloud-based web object indexing platform. The neural network 405 comprises an input layer, a hidden layer, and an output layer. The input layer comprises inputs that receive respective pixels $x_i$ of an image being processed. The indexing application comprising neural network 405 additionally comprises a graph analyzer configured to generate an in-memory acyclic graph 408. The in-memory acyclic graph 408 characterizes relationships between elements of particular web objects and in the present embodiment provides an additional machine learning processing layer at the output of the neural network 405 of the machine learning engine of the given indexing application.

The in-memory acyclic graph 408 is illustratively a type of Arbitrary Connected Graph (ACG) and may be processed at least in part utilizing an in-memory data analytics product such as Tachyon.

In operation, the neural network 405 generates outputs indicative of the presence of particular designated objects within the processed image, such as a man, a train and a mountain, among others. These outputs are applied to particular nodes of the in-memory acyclic graph 408, which illustratively comprise respective RDF triples. Arrows between respective pairs of nodes of the in-memory acyclic graph 408 in this embodiment denote semantic relations. For example, a semantic relation 425 exists in the in-memory acyclic graph 408 between the pair of nodes 9 and 14 of the graph. Such semantic relations and the associated RDF triples are utilized in generating semantic information comprising output features and relations that are associated with the processed image.

Additional details regarding examples of in-memory graph analytics functionality that may be utilized in illustrative embodiments can be found in U.S. patent application Ser. No. 14/977,960, filed Dec. 22, 2015 and entitled "Multi-Tier Storage System Having a Front-End Storage Tier Facilitating Efficient Graph Analytics Computations," which is incorporated by reference herein.

Figure 5:
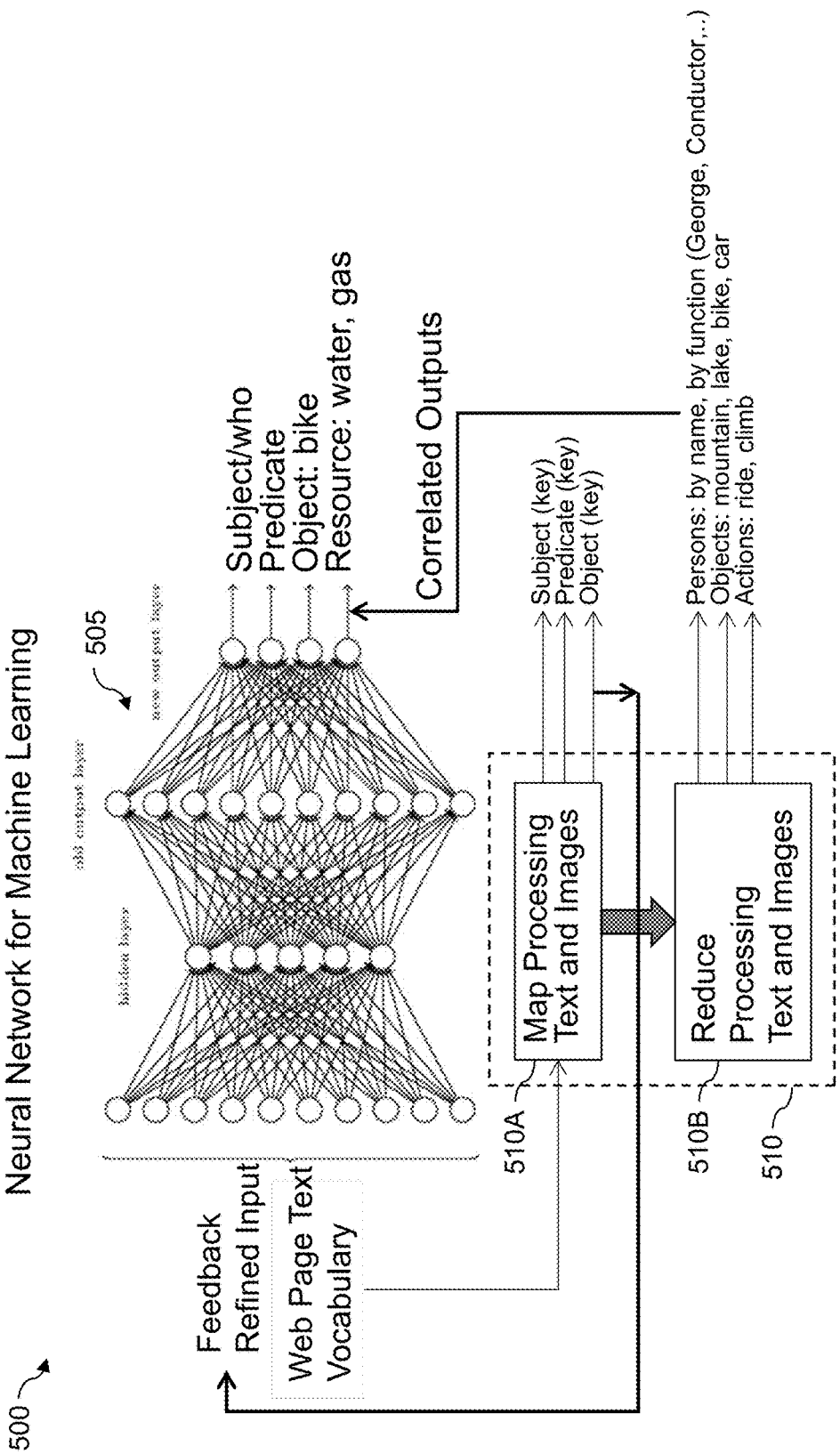

FIG. 5 shows an information processing system 500 comprising a neural network 505 in another illustrative embodiment. The neural network 505 in this embodiment is assumed to be implemented at least in part by a map-reduce processing unit 510 that illustratively comprises a map processing unit 510A and a reduce processing unit 510B. The map-reduce processing unit 510 is configured to particular designated persons, objects, actions or other items in web objects comprising respective web pages. Text vocabulary instances of a given web page are applied to respective inputs of an input layer of the neural network 505. The text vocabulary instances are processed within the neural network 505 to generate at the new output layer indications regarding the presence of the particular designated persons, objects, actions or other items within the given web page. Such indications are utilized to generate semantic information that is associated with the given web page.

The map-reduce processing unit 510 and its associated neural network 505 in the FIG. 5 embodiment are assumed to be part of a machine learning engine corresponding to a particular indexing application of a cloud-based web object indexing platform. Such an indexing application can include additional components such as a graph analyzer and a semantic information generator that process outputs of the neural network 505 to provide semantic information that is associated with the particular web page being processed.

The map processing unit 510A and reduce processing unit 510B implement respective map and reduce phases of map-reduce functionality of the indexing application of the cloud-based web object indexing platform. Such map and reduce phases are illustratively configured to operate on both text and images of a web page.

In this embodiment, outputs of the map phase of the map-reduce processing implemented by map processing unit 510A are fed back as learning data inputs to the machine learning engine of the given indexing application prior to performing the reduce phase of the map-reduce processing in reduce processing unit 510B. For example, particular subjects, predicates and objects having respective corresponding keys are illustratively fed back from corresponding outputs of the map processing unit 510A as refined inputs to the input layer of the neural network 505. Accordingly, this embodiment is an example of an arrangement that utilizes mapped data from the map phase to refine the training input of the neural network before the reduce phase. In addition, outputs of the reduce processing unit 510B such as persons, objects, actions or other items are correlated with outputs of the neural network 505 in generating semantic information within the indexing application.

The embodiments of FIGS. 3 through 5, like those of FIGS. 1 and 2, are illustrative only, and should not be construed as limiting in any way.

These and other illustrative embodiments disclosed herein can provide a number of significant advantages relative to conventional arrangements.

For example, as mentioned previously, a cloud-based web object indexing platform that processes web objects to generate semantic information and associates the semantic information with those web objects can significantly improve the efficiency of search engines or data analytics engines that process the enhanced web objects, while also allowing those engines to generate more accurate and useful search or analytics outputs. Such embodiments provide improved search and analytics performance in an efficient manner that does not interfere with the functionality of the engines.

Accordingly, problems associated with a lack of semantic information for particular types of web objects in conventional practice can be readily overcome. For example, surveillance systems that generate images or video can utilize an indexing application to automatically analyze and annotate the images or video with semantic information that facilitates subsequent search of the images or video.

Similar improvements are provided for numerous other types of systems that involve the generation of web objects, including systems that process outputs from sensors or other devices that are part of the Internet of Things.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as indexing applications 110, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement indexing applications for semantic indexing of web objects in illustrative embodiments.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of cloud-based web object indexing platform 106 and its indexing applications 110 and indexing controller 120 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, web servers, networks, platforms, indexing applications and associated controllers. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a cloud-based web object indexing platform configured to communicate with multiple web servers over at least one network; wherein the cloud-based web object indexing platform comprises:
  a plurality of indexing applications comprising respective machine learning engines;
  a given one of the indexing applications being configured to receive web objects over the network from one or more of the web servers and to analyze the received web objects utilizing its corresponding machine learning engine;
  a given one of the received web objects comprising at least one of text images and video;
  the machine learning engine of the given indexing application being configured to recognize particular features of the received web objects by analyzing the received web objects in accordance with a machine learning data set based at least in part on previously-analyzed web objects;
  the given indexing application being further configured to generate semantic information for association with particular ones of the web objects based at least in part on recognition of the particular features of the received web objects by the corresponding machine learning engine;
  wherein access to the semantic information is provided by the cloud-based web object indexing platform in association with the particular web objects over the network; and
  wherein the cloud-based web object indexing platform is implemented by at least one processing device comprising a processor coupled to a memory.

2. The apparatus of claim 1 wherein at least a subset of the web objects each comprise at least one of text, images and video and at least portions of the semantic information comprise Resource Description Framework (RDF) triples.

3. The apparatus of claim 1 wherein at least a subset of the machine learning engines comprise respective neural networks and have respective machine learning data sets generated based at least in part on previously analyzed web objects.

4. The apparatus of claim 1 wherein the cloud-based web object indexing platform further comprises a controller associated with the indexing applications and configured to control semantic information generation functionality of the indexing applications including at least one of image processing functionality implemented on a graphical processing unit and map-reduce functionality implemented on a map-reduce processing unit.

5. The apparatus of claim 4 wherein the controller comprises a policy engine and wherein the controller is further configured to adapt operation of the given indexing application to at least one policy of the policy engine wherein said at least one policy identifies at least one of particular types of web objects to be associated with semantic information by the given indexing application and particular manners in which those web objects are to be associated with semantic information by the given indexing application.

6. The apparatus of claim 1 wherein the given indexing application comprises a graph analyzer configured to generate an acyclic graph characterizing relationships between elements of at least a subset of the web objects and wherein the acyclic graph provides an additional machine learning processing layer at an output of a neural network of the machine learning engine of the given indexing application.

7. The apparatus of claim 1 wherein the given indexing application comprises a semantic information generator that receives recognition information from the corresponding machine learning engine and generates separate sets of semantic information for respective ones of the particular web objects.

8. The apparatus of claim 1 wherein the given indexing application associates the semantic information with the particular web objects by incorporating portions of the semantic information into metadata of respective ones of the particular web objects.

9. The apparatus of claim 1 wherein the given indexing application associates the semantic information with the particular web objects by incorporating portions of the semantic information into respective XML semantic information fields of respective ones of the particular web objects.

10. The apparatus of claim 9 wherein the portion of the semantic information incorporated into the XML semantic information field of one of the particular web objects comprises at least one Resource Description Framework (RDF) triple.

11. The apparatus of claim 1 wherein the cloud-based web object indexing platform provides access to the semantic information in association with the particular web objects over the network by storing the semantic information in association with the particular web objects in a manner that is accessible to at least one of a search engine and a data analytics engine.

12. The apparatus of claim 1 wherein the cloud-based web object indexing platform provides access to the semantic information in association with the particular web objects over the network by providing modified versions of the particular web objects back to the web servers from which the web objects were previously received wherein the modified versions comprise respective corresponding portions of the semantic information.

13. The apparatus of claim 1 wherein a given one of the web objects comprises a web page, the web page comprising a plurality of elements including two or more of text, images and video, and further wherein different portions of the semantic information are associated with respective different descriptors of respective ones of the elements of the web page.

14. The apparatus of claim 1 wherein the given indexing application is configured to implement map-reduce processing having a map phase and a reduce phase and further wherein one or more outputs of the map phase of the map-reduce processing are fed back as learning data inputs to the machine learning engine of the given indexing application prior to performing the reduce phase of the map-reduce processing.

15. A method comprising:
configuring a cloud-based web object indexing platform to communicate with multiple web servers over at least one network, the cloud-based web object indexing platform comprising a plurality of indexing applications having respective machine learning engines;
receiving web objects in a given one of the indexing applications from one or more of the web servers over the network, a given one of the received web objects comprising at least one of text, images and video;
analyzing the received web objects in the given indexing application utilizing its corresponding machine learning engine, the machine learning engine of the given indexing application being configured to recognize particular features of the received web objects by analyzing the received web objects in accordance with a machine learning data set based at least in part on previously-analyzed web objects;
generating semantic information in the given indexing application for association with particular ones of the web objects based at least in part on recognition of particular features of the received web objects by the corresponding machine learning engine; and
providing access to the semantic information in association with the particular web objects over the network;
wherein the cloud-based web object indexing platform is implemented by at least one processing device comprising a processor coupled to a memory.

16. The method of claim 15 wherein the given indexing application associates the semantic information with the particular web objects by incorporating portions of the semantic information into metadata of respective ones of the particular web objects.

17. The method of claim 15 wherein access to the semantic information is provided in association with the particular web objects over the network by providing modified versions of the particular web objects back to the web servers from which the web objects were previously received wherein the modified versions comprise respective corresponding portions of the semantic information.

18. A computer program product comprising a non-transitory processor-readable storage medium having stored therein program code of one or more software programs, wherein the program code when executed by at least one processing device causes said at least one processing device:
to configure a cloud-based web object indexing platform to communicate with multiple web servers over at least one network, the cloud-based web object indexing platform comprising a plurality of indexing applications having respective machine learning engines;
to analyze web objects received from one or more of the web servers over the network in a given one of the indexing applications utilizing its corresponding machine learning engine, a given one of the received web objects comprising at least one of text, images and video, the machine learning engine of the given indexing application being configured to recognize particular features of the received web objects by analyzing the received web objects in accordance with a machine learning data set based at least in part on previously-analyzed web objects;
to generate semantic information in the given indexing application for association with particular ones of the web objects based at least in part on recognition of particular features of the received web objects by the corresponding machine learning engine; and
to provide access to the semantic information in association with the particular web objects over the network;
wherein the cloud-based web object indexing platform is implemented by at least one processing device comprising a processor coupled to a memory.

19. The computer program product of claim 18 wherein the given indexing application associates the semantic information with the particular web objects by incorporating portions of the semantic information into metadata of respective ones of the particular web objects.

20. The computer program product of claim 18 wherein access to the semantic information is provided in association with the particular web objects over the network by providing modified versions of the particular web objects back to the web servers from which the web objects were previously received wherein the modified versions comprise respective corresponding portions of the semantic information.

* * * * *